United States Patent [19]

Cayton

[11] Patent Number: 4,713,891

[45] Date of Patent: Dec. 22, 1987

[54] COLUMN MARKER

[75] Inventor: Nancy M. Cayton, Fairmount, W. Va.

[73] Assignee: Educational Experiences, Inc., Fairmount, W. Va.

[21] Appl. No.: 23,358

[22] Filed: Mar. 9, 1987

[51] Int. Cl.[4] .......................... B43L 7/00; G01B 3/04

[52] U.S. Cl. .......................... 33/494; 33/1 G

[58] Field of Search .......................... 33/1 B, 1 G, 494

[56] References Cited

U.S. PATENT DOCUMENTS

| | | | |
|---|---|---|---|
| 1,369,833 | 3/1921 | Murphy | 33/1 G |
| 1,528,992 | 3/1925 | Rose | 33/494 |
| 1,587,133 | 6/1926 | Anhof | 33/1 B |
| 1,687,429 | 10/1928 | Datson | 33/494 |
| 1,776,245 | 9/1930 | Barrett | 33/494 |
| 2,077,828 | 4/1937 | Dombrowski | 33/494 |
| 2,547,745 | 4/1951 | Cade et al. | 33/1 |
| 3,968,574 | 7/1976 | Ellis | 33/1 G |
| 4,221,057 | 9/1980 | Luikart | 33/494 |

FOREIGN PATENT DOCUMENTS

| | | | |
|---|---|---|---|
| 170006 | 1/1952 | Austria | 33/494 |

*Primary Examiner*—Richard R. Stearns

*Attorney, Agent, or Firm*—Griffin, Branigan & Butler

[57] ABSTRACT

A column marker (10) to be used for marking columns on a book layout sheet (42) comprises an elongated ruler member (12) defining a straightedge (14) and a display surface (16) having unique column-marking indicia thereon. The unique column-marking indicia includes a plurality of sets (18A-G) of three side-to-side adjacent elongated bars (20A, 22A; and 24A; 20R; 22B, and 24B, etc.). The bars are parallel to the straightedge and many of the bars in each set are longer than other bars in the set. The longer bars are positioned further from the straightedge than the shorter bars. First ends (26) of the bars are aligned, while perpendicular tails (28 and 30) at second ends of the longer bars extend to the straightedge beyond ends of the shorter bars (32A-32G). The column marking indicia further includes set-identifying indicia (32A-32G) to indicate the number of columns per page each set is to be used with, and bar-identifying indicia (34) to indicate which bar in each set is to be used for a particular size book page. Each bar in each set has a different color than other bars in that set, but each set has bars with the same color as bars in other sets. The bar-identifying indicia identifies the particular page size each color represents.

9 Claims, 2 Drawing Figures

COLUMN MARKER

BACKGROUND OF THE INVENTION

This invention relates broadly to the art of preparing layouts for books, and more particularly to preparing layouts for school yearbooks.

High school and college yearbooks consist mainly of copy (textual material), photographs, and graphic art. Most of these materials are created and organized for publication by students. In this regard, after the material is created it is "layed out" by the students to appear in a certain order and in certain combinations with other related materials. For example, a cartoon tennis character, photographs of tennis team members, and copy relating to the tennis team's seasons might be layed out on a double-page spread (two facing, or side-by-side, pages). The student yearbook workers indicate the organization of these materials on layout sheets before sending the materials and the layout sheets to printers who print the materials in yearbooks. In order to layout these materials students must decide how many columns each page will have and then they must position all copy, photographs, and graphic art, exactly as it will appear in the yearbook, within the chosen column arrangement.

Yearbooks are normally made having either 9 ×12 inch, 8½×11 inch, or 7¾×10 inch trim sizes (the sizes after the sheets have been trimmed to their appropriate page sizes). Thus, double-spread layout sheets used by student yearbook personnel have pages which are usually one of these sizes, depending on the size yearbook the school wishes to publish. The layout sheets have imprinted thereon vertical pica grid lines at 1/6 inch horizontal intervals (the size of one pica) and, in the center thereof, they have a vertical gutter line corresponding to the gutter (the center of a double page spread where the two pages meet) at the center of a book. Such a layout sheet, having a center gutter line with pages on opposite sides of the gutter line, is sometimes referred to as a spread.

Student yearbook personnel are normally instructed to begin page columns one or two picas from the gutter line on the layout sheets and to place at least one pica of white space between columns. Further, the students are normally instructed as to how many picas are in a column depending on the number of columns desired per page or spread and the size of the pages. In addition, the students are instructed not to place graphic material beyond the outside edges of the outside columns, although it is permissible to place photographs in the white spaces between columns. Using these and other instructions, student yearbook personnel place rectangles on the layout sheets identifying copy, photographs, and graphic art to appear thereat. However, such student personnel often make mistakes in calculating and marking the widths and positions of columns and therefore improperly layout their materials. In such cases, when the layout sheets along with the copy, photographs, and graphic art are forwarded to printers, the printers usually send these materials back to the school to be corrected prior to printing. As can be imagined, such a process unduly disrupts printing schedules of yearbooks, sometimes even postponing the availability date of yearbooks beyond the last days of school, thereby making it difficult to distribute them.

For this reason, it is an object of this invention to provide a column marker to be used by student yearbook personnel which makes it easy for such personnel to properly position and determine the widths of columns to be placed on a yearbook layout sheet.

It is a further object of this invention to provide a column marker which is sufficiently easy for personnel organizing a book to use that they can layout columns with much less fear of making mistakes than has been the case in the past and, therefore, with greater speed.

Further, it is an object of this invention to provide such a column marker which is inexpensive and durable.

SUMMARY

According to principles of this invention, a column marker comprises an elongated ruler member defining a straightedge along one edge thereof and a display surface adjacent to the straightedge. Columnmarking indicia on the display surface includes a plurality of sets of a plurality of side-to-side adjacent, elongated bars, with the bars being parallel to the straightedge. The column-marking indicia further includes set-identifying indicia for indicating the particular number of columns per page that each bar set is to be used with, and bar-identifying indicia for designating a particular book-page size with which each bar is to be used.

The longer bars in each set are positioned further from the straightedge than the shorter bars and have perpendicular tails at which extend perpendicular to the straightedge at an end of the shorter bars. Each bar in each set has a different identifying marking (such as color) than the other bars in that set but each set has a bar with the same markings as a bar in the other sets, the bar-identifying indicia specifying that each particular identifying marking pertains to a page size.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
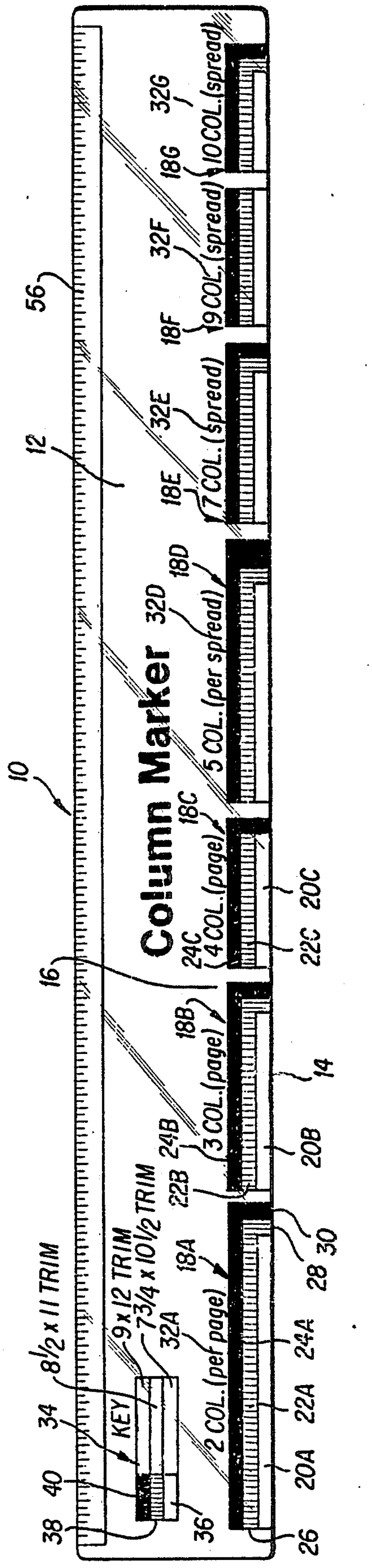
FIG. 1 is a plan view of a column marker of this invention.

A book page column marker 10 comprises an elongated ruler member 12 comprised of a hard, flat, transparent, sheet of plastic having a length of about 18 inches, a breadth of about 2½ inches and a thickness of about 1/64 of an inch. The ruler member 12 defines a straightedge 14 along one edge thereof which extends approximately the entire length of the ruler member 12 and a display surface 16 on the top surface thereof on which column-marking indicia can be printed immediately adjacent to the straightedge 14.

There are basically three types of column-marking indicia on the ruler member 12, all of which interrelate one to the other. The first type of indicia includes sets 18A–18G of elongated, parallel, side-to-side adjacent, bars 20A, 22A, 24A; 20B, 22B, 24B; etc., with each set having three bars numbered 20, 22, and 24 respectively with a letter corresponding to the letter of the reference numeral of the set. The first bar in each group 20A, 20B, etc., is immediately adjacent to the straightedge 14 while the second bar 22A, 22B, 22C, etc. is usually slightly longer than the first bar and is immediately adjacent thereto. Finally, the third bar 24A, 24B, etc. for each set is in most cases slightly longer than either the first or the second bar of the set and is immediately adjacent to the second bar 22A, 22B, etc. It will be noted that the left ends (as viewed in FIG. 1) of these bars for each set are aligned along a left-end line 26 which is perpendicular to, and which extends to, the straightedge 14. On the other hand, right ends of the second and third bars 22A, 22B, 22C, etc. and 24A, 24B, 24C, etc., respectively include perpendicular tails 28 and 30 which are perpendicular to the straightedge 14, and which extend thereto, beyond ends of other bars which are shorter than they in the set. Thus, bar 22A of set 18A includes a perpendicular tail 28 extending to the straightedge 14 beyond a right end of the first bar 20. Similarly, the third bar 24A of set 18A includes a perpendicular tail 30 extending beyond the end of the second bar tail 28 down to the straightedge 14. These tails 28 and 30, along with left end lines 26 allow a user to identify ends of all three bars of each set along the straightedge 14. It is noted that some of the second and third bars 22 and 24 of some of the sets do not have perpendicular tails, such as the second bar 22C of set 18C and the second and third bars in set 18F. These bars are not longer than lower bars in their sets.

The second type of indicia on the display surface 16 of the ruler member 12 is set-identifying indicia 32A–32G, with the letter of these reference numerals corresponding to the letters of the sets. Each of the set-identifying indica 32A–32G identifies a particular number of columns on a printed book page with which its set is to be used. For example, set-identifying indicia 32A states that the bars of set 18A are to be used to mark off two columns per page. Similarly, set identifying indicia 32B for set 18B indicates that the bars thereof are to be used for three columns per page while the set-identifying indica 32C indicates that set 18C is used for four columns per page. As can be seen, the various sets are progressively for use to mark off from two to ten columns.

The third type of indicia is bar-identifying indicia 34 which identifies each bar in each set as being used with a particular size book page. The bar-identifying indicia 34 is in the form of a key which includes three identifying markings 36, 38, and 40, such as colors, and page-size dimensions corresponding to these colors. For example, in the column marker of FIG. 1, the identifying marking 36 corresponds to trimmed pages $7\frac{3}{4}\times 10\frac{1}{2}$ inches. In this regard, each bar set 18A, 18B, etc. has three bars and each bar of each set has one of the markings shown in the key 34. The user knows from looking at the key, for example, that the first bar 20A of set 18A, and the first bar 20B of set 18B are to be used with the page size $17\frac{3}{4}$ by $10\frac{1}{2}$.

Figure 2:
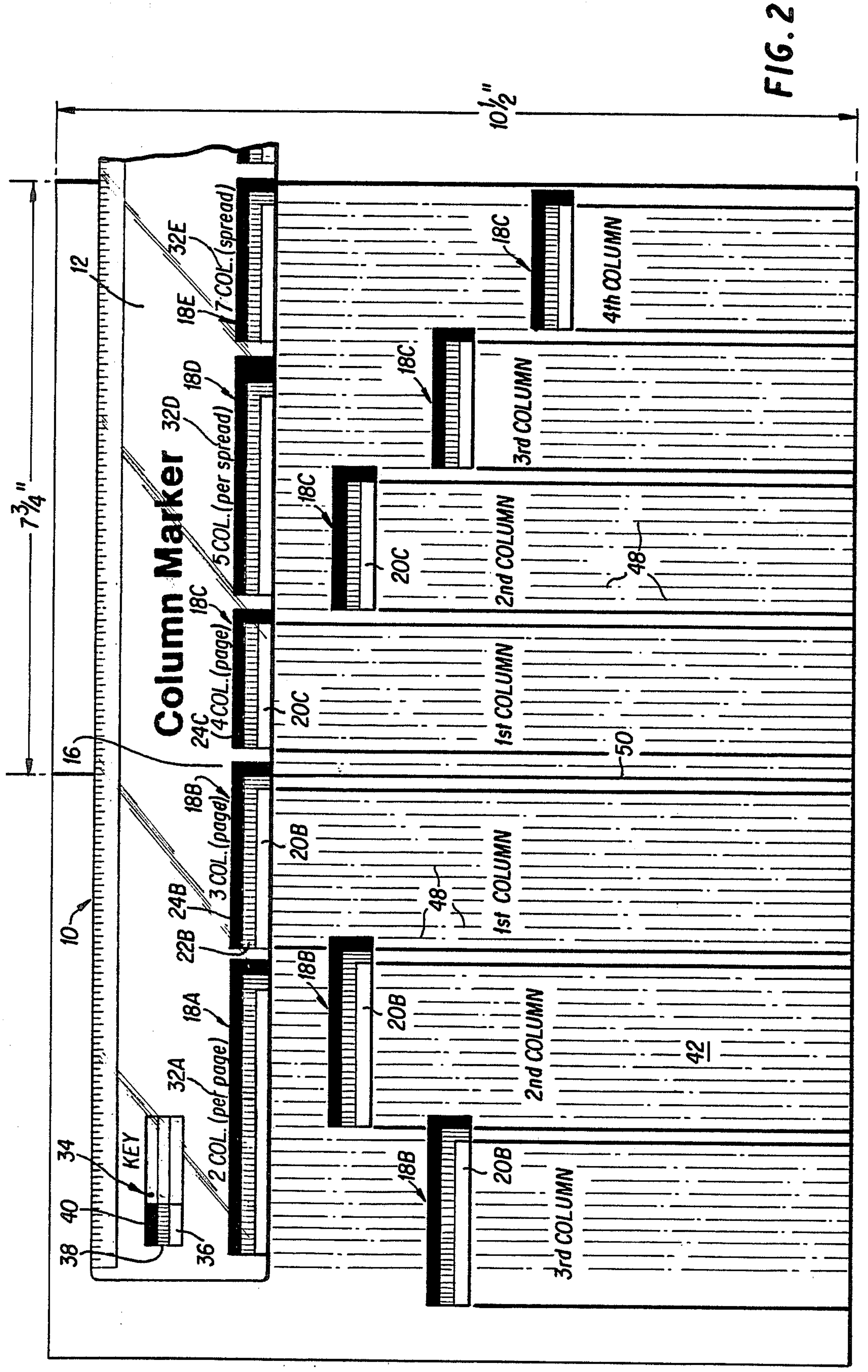
FIG. 2 is a plan view of a yearbook layout sheet with a column marker of this invention, as well as parts of a column marker of this invention, superimposed thereon to measure columns on the layout sheet.

Use of the column marker of FIG. 1 is described with reference to FIG. 2. FIG. 2 shows a double page layout sheet 42 with each page being $7\frac{3}{4}$ across by $10\frac{1}{2}$ inches tall and having vertical pica lines 48 with a vertical gutter line 50 in the middle between the two pages. The vertical pica lines 48 are each spaced one pica (1/6 of an inch) from adjacent pica lines or from the gutter line 50 if it is adjacent. To use the column marker, yearbook personnel decide how many columns per page or spread they wish to have. In the arrangement of FIG. 2 the yearbook personnel have chosen to have three columns-per-page on the left page and four columns-per-page on the right page, thus, they know to use the sets of bars 18B and 18C which are designated by set-identifying indicia 32B and 32C as being used for three and four columns respectively. An operator alternately places the left end 26 of the bar 20C of set 32C and the right end 52 of the bar 20B of set 32B one or two picas from the gutter line 50 (bar 20B is shown 1 pica from the gutter line while bar 20C is shown to be 2 picas from the gutter line in FIG. 2) and using these bars, which one sees from the bar-identifying indicia 34 relate to a page which is $7\frac{3}{4}\times 10\frac{1}{2}$ inches, places a mark at the other ends of the bars 22B and 22C to indicate the outside edges of the first, inside, columns on the pages. The yearbook worker then leaves a pica of white space which he measures using the pica lines on the layout sheet 42 and again manipulates the column marker 10 to place the bars 22B and 22C horizontally on the layout sheet 42 beside his first columns and makes marks at opposite ends of the bars to identify second columns. This procedure is repeated for third columns outside of the second columns and, for the right-hand page, it is repeated for a forth column. For illustrative purposes, the bar sets are shown schematically on the pages in FIG. 2 for marking 2*d,* 3*d* and 4th columns. Thereafter, yearbook personnel can use these marked-off columns to layout copy, photographs and graphic art to be printed in the yearbook by a printer. It will be readily understood that a similar procedure could have been followed for obtaining a column-per-page, 5 columns-per-spread, 7 columns-per-spread or any of the number of columns designated by the set-identifying indicia 32A–32G. Further, it could be used to form these different column arrangements on pages having the sizes identified by the bar-identifying indicia 34.

It will be appreciated by those of ordinary skill in the art that the column marker of this invention is not only easy to manufacture and quite durable, but is also easy for inexperienced personnel to use in setting up columns for school yearbooks. In this regard, this column marker enables inexperienced persons to set up columns for yearbooks in a much easier manner than was previously possible and therefore not only eliminates many mistakes which have been made in the past but saves time as well.

While the invention has been particularly shown and described with reference to a preferred embodiment, it will be understood that the various changes in form and detail may be made therein without departing from the spirit and scope of the invention. For example, rather than using a key for the bar-identifying indicia 34, this indicia could be imprinted on each bar. Similarly, the set-identifying indicia 32A–32G could be displayed differently. Further, it would be possible to have narrower perpendicular bar tails 28 and 30 at opposite ends of a set, rather than having all of the bars of a set line up at one end and have tails at the other end. Still further, a pica scale 56 can be included on the ruler member 12 for the use of yearbook personnel.

The embodiments of the invention in which an exclusive property or privilege are claimed are defined as follows:

1. A book page column marker for providing indications of appropriate column widths of material to be printed on book pages, said column marker comprising:
an elongated ruler member defining a straightedge along one edge thereof and a display surface adjacent said straightedge for displaying indicia;
indicia on said display surface including a plurality of sets of elongated bars, each of said sets having a plurality of side-to-side adjacent bars, each bar being parallel to said straightedge and to each other but not being in side-to-side adjacent relationship to bars in another set, at least one of said bars in each of a plurality of said sets being longer than the other bars of the set, said indicia further including lines perpendicular to said straightedge extending from the ends of each elongated bar to said straightedge, said indicia further including set-identifying indicia for identifying each bar set to be used for marking a particular number of columns to be printed on a book page and said indicia further including bar-identifying indicia for identifying the particular size book pages with which each bar in each set is to be used;
wherein the length dimension of each bar corresponds to the width of a column for the number of columns indicated by the set-identifying indicia for its respective set and for the size of the page as indicated by the bar-identifying indicia for the respective bar;
whereby a user who wishes to layout material to be printed on a page decides how many columns of printed material per page he wishes to have, chooses the particular elongated-bar set on the marker corresponding to said number of columns per page, ascertains the size of the page on which he wishes to print material, chooses the particular elongated bar in said particular elongated bar set corresponding to that size page, and uses said particular elongated bar to layout columns on the page.

2. A book page column marker as in claim 1, wherein all of the bars of each set have one end thereof aligned along a line perpendicular to the straightedge.

3. A book page column marker as in claim 2, wherein said longer bars of each set are positioned further from said straightedge than are shorter bars of each said set.

4. A book page column marker as in claim 3, wherein each bar has different identifying markings thereon than the other bars in its set, but the same markings as bars in the other sets, with a particular marking identifying all bars to be used with a particular size page and wherein said bar-identifying indicia includes a key stating the page sizes corresponding to particular identifying markings of the bars.

5. A book page column marker as in claim 1, wherein each bar in each set has different identifying markings thereon than the other bars in its set, but the same markings as bars in the other sets, with a particular marking identifying all bars to be used with a particular size page and wherein said bar-identifying indicia includes a key stating the page sizes corresponding to particular identifying markings of the bars.

6. A book page column marker as in claim 1, wherein said longer bars of each set are positioned further from said straightedge than are shorter bars of each said set.

7. A book page column marker as in claim 6, wherein some bars have tails thereon which extend from the bars perpendicular to said straightedge beyond the ends of shorter bars of their respective sets.

8. A book page column marker as in claim 7, wherein one end of the bars of each set are aligned.

9. A book page column marker as in claim 1, wherein there are three bars in each set.

* * * * *